United States Patent
Hanabusa et al.

[19]

[11] Patent Number: 6,111,763
[45] Date of Patent: Aug. 29, 2000

[54] SWITCHING POWER SUPPLY

[75] Inventors: Kazuyoshi Hanabusa; Hironobu Masuoka; Katsunori Imai, all of Tokyo, Japan

[73] Assignee: TDK Corporation, Tokyo, Japan

[21] Appl. No.: 09/492,276

[22] Filed: Jan. 27, 2000

[30] Foreign Application Priority Data

Jan. 27, 1999 [JP] Japan .................................. 11-017939

[51] Int. Cl.$^7$ ................................................. H02M 3/335
[52] U.S. Cl. ............................................................ 363/21
[58] Field of Search ................................ 363/21, 131, 95

[56] References Cited

U.S. PATENT DOCUMENTS 5,995,387  11/1999  Takahashi et al. ......................... 363/21

FOREIGN PATENT DOCUMENTS 8-242581  9/1996  Japan .

*Primary Examiner*—Shawn Riley
*Attorney, Agent, or Firm*—Oblon, Spivak, McClelland, Maier & Neustadt, P.C.

[57] ABSTRACT

A switching power supply capable of executing output voltage stabilizing control with a high degree of reliability even when the DC output voltage is at DC 2V or lower. A DC—DC converter unit 1 converts a DC input voltage Vin to DC through switching and outputs a DC output voltage Vo for a load 10 through output lines 71 and 72. An auxiliary power unit 3, which is electrically linked to the DC—DC converter unit 1, outputs a DC voltage Va through an auxiliary source output line 30 having a potential that is negative relative to the potential at the lower-potential output line 72. An output voltage detection unit 2, connected between the higher-potential output line 71 and the auxiliary source output line 30, detects a DC voltage (Vo+Va) manifesting between them and provides the detection signal to a control unit 4 via a photocoupler 9. The control unit 4 implements output voltage stabilizing control on the DC—DC converter unit 1.

5 Claims, 8 Drawing Sheets

SWITCHING POWER SUPPLY

BACKGROUND OF THE INVENTION

1. Field of the Invention

The present invention relates to a switching power supply, and more specifically, to a switching power supply that outputs a DC voltage of, for instance, DC 2V or lower.

2. Discussion of Background

Normally, a switching power supply converts DC to DC through switching performed at a DC—DC converter unit and outputs a DC voltage for a load through a pair of output lines. It is provided with an output voltage detection circuit constituting a means for achieving stabilization by monitoring the DC output voltage. The detection signal output by the output voltage detection circuit is provided to a control circuit. The control circuit implements output voltage stabilizing control on the DC—DC converter unit based upon the detection signal thus provided.

The output voltage detection circuit may assume a circuit structure comprising a resistive potential divider circuit, a 3-terminal regulator and a light emitting diode constituting a photocoupler, as disclosed in, for instance, Japanese Unexamined Patent Publication No. 242581/1996. The resistive potential divider circuit, which is connected between a pair of output lines, divides a DC output voltage and inputs a voltage resulting from the division to the control terminal of the 3-terminal regulator. The light emitting diode is connected in series to the main circuit of the 3-terminal regulator. The serial circuit thus achieved is connected between output lines of the DC—DC converter unit.

When the DC output voltage rises, thereby raising the divided voltage as well, the 3-terminal regulator performs an operation to increase/decrease the current flowing through the main circuit. This causes the current flowing through the light emitting diode connected in series to the 3-terminal regulator to increase/decrease accordingly.

The control circuit receives the detection signal via a phototransistor which, together with the light emitting diode, constitutes the photocoupler and implements control on the DC—DC converter unit to stabilize the DC output voltage.

The switching power supply assuming the circuit structure described above operates in a stable manner in the DC output voltage range of several volts and higher, which has been the range of output voltages of most switching power supplys to date. However, the output voltage detection circuit in the prior art cannot support the increasingly lower voltages that are observed with increasing frequency in recent years in electronic circuits driven by this type of switching power supply.

Namely, since the serial circuit constituted of the 3-terminal regulator and the light emitting diode in the output voltage detection circuit is connected between the output lines of the DC—DC converter unit, the DC output voltage manifesting between the output lines must be higher than the sum (approximately 2.35V) of the operating voltage of the 3-terminal regulator (approximately 1.25V) and the forward voltage at the light emitting diode (approximately 1.1V). If the DC output voltage becomes lower than the voltage corresponding to the degree of voltage reduction (approximately DC 2.35V) required at the 3-terminal regulator and the light emitting diode, the output voltage detection circuit can no longer engage in stable operation. In other words, a reliable output voltage stabilizing control function cannot be assured in a switching power supply with an output voltage of DC 2V or lower by adopting the circuit structure of the prior art.

SUMMARY OF THE PRESENT INVENTION

It is an object of the present invention to provide a switching power supply that is capable of executing output voltage stabilizing control in a reliable manner even when the DC output voltage is DC 2V or lower.

In order to achieve the object described above, the present invention discloses a switching power supply in three modes.

The switching power supply in the first mode comprises a DC—DC converter unit, an output voltage detection unit, an auxiliary power unit and a control unit. The DC—DC converter unit converts DC to DC through switching and outputs a DC voltage for a load through, at least, a pair of output lines.

The auxiliary power unit, which is electrically linked with the DC—DC converter unit, outputs a DC voltage through an auxiliary source output line having a potential that is negative relative to the potential at the output line with a lower potential of the pair of output lines.

The output voltage detection unit includes a resistive potential divider circuit, a 3-terminal regulator and a light emitting diode. The resistive potential divider circuit divides the DC voltage manifesting between the higher-potential output line or the lower-potential output line and the auxiliary source output line. The 3-terminal regulator receives a voltage signal resulting from the division achieved by the resistive potential divider circuit as a control signal. The serial circuit achieved by connecting in series the light emitting diode to the main circuit of the 3-terminal regulator is connected between the higher potential output line of the pair of output lines led from the DC—DC converter unit and the auxiliary source output line led out from the auxiliary power unit.

The control unit, which includes a phototransistor employed in combination with the light emitting diode, implements output voltage stabilizing control on the DC—DC converter unit based upon a detection signal provided via the light emitting diode and the phototransistor.

The basic operation performed by the switching power supply in the first mode does not differ from that achieved by the switching power supply in the prior art. The DC—DC converter unit converts DC to DC through switching and outputs a DC voltage for a load through, at least, a pair of output lines. The output voltage detection unit provides a DC voltage detection signal to the control unit via the photocoupler. The control unit implements output voltage stabilizing control on the DC—DC converter unit based upon the detection signal provided by the output voltage detection unit. Through this sequence of operations, a stable DC output voltage is obtained.

The switching power supply in the first mode is characterized by the presence of the auxiliary power unit and the utilization of the auxiliary source at the output voltage detection unit. The auxiliary power unit, which is electrically linked with the DC—DC converter unit, outputs a DC voltage through its auxiliary source output line achieving a potential that is negative relative to the potential at the lower-potential output line of the pair of output lines. Thus, the difference in the potential between the auxiliary source output line and the higher-potential output line of the pair of output lines is equal to the sum of the potential difference between the lower potential output line and the auxiliary source output line and the potential difference (DC output voltage) between the pair of output lines.

The 3-terminal regulator and the light emitting diode at the output voltage detection unit are connected in series and the two ends of the serial circuit thus achieved are connected between the higher-potential output line of the pair of output lines and the auxiliary source output line. As a result, even when the DC output voltage is set at, for instance, DC 2V or lower and the potential difference (DC output voltage) between the pair of output lines becomes small, the output voltage detection circuit can be operated in a state that is equivalent to the state in which the DC output voltage is raised, achieved by the potential difference between the lower-potential output line and the auxiliary source output line, so that the DC output voltage can be controlled to achieve stability.

The resistive potential divider circuit at the output voltage detection unit detects the DC voltage manifesting between the higher-potential output line or the lower-potential output line and the auxiliary source output line. When the resistive potential divider circuit detects the DC voltage manifesting between the higher-potential output line and the auxiliary source output line, a potential difference corresponding to the sum of the potential difference between the lower-potential output line and the auxiliary source output line and the potential difference (DC output voltage) between the pair of output lines is detected.

While the DC voltage manifesting between the lower potential output line and the auxiliary source output line detected by the resistive potential divider circuit is lower than the detected DC voltage manifesting between the higher-potential output line and the auxiliary source output line, no problem arises in voltage detection since the difference in the potential between the lower-potential output line and the auxiliary source output line can be selected as appropriate during the design stage.

In the switching power supply in the second mode, the auxiliary power unit is electrically linked with the DC—DC converter unit, and outputs a DC voltage through its auxiliary source output line having a potential that is positive relative to the potential at the higher-potential output line of the pair of output lines.

The resistive potential divider circuit of the output voltage detection unit divides the DC voltage manifesting between the lower-potential output line or the higher-potential output line and the auxiliary source output line. The 3-terminal regulator and the light emitting diode are connected to each other in series and the two ends of the serial circuit thus achieved are connected between the lower-potential output line of the pair of output lines led out from the DC—DC converter unit and the auxiliary source output line led out from the auxiliary power unit.

In the switching power supply in the second mode, the auxiliary power unit, which is electrically linked with the DC—DC converter unit, outputs a DC voltage through its auxiliary source output line achieving a potential that is positive relative to the potential at the higher-potential output line of the pair of output lines. Thus, the difference in the potential between the auxiliary source output line and the lower-potential output line of the pair of output lines is equal to the sum of the potential difference between the higher-potential output line and the auxiliary source output line and the potential difference (DC output voltage) between the pair of output lines.

The 3-terminal regulator and the light emitting diode at the output voltage detection unit are connected in series and the two ends of the serial circuit thus achieved are connected between the lower-potential output line of the pair of output lines and the auxiliary source output line. As a result, even when the DC output voltage is set at, for instance, DC 2V or lower and the potential difference (DC output voltage) between the pair of output lines becomes small, the output voltage detection circuit can be operated in a state that is equivalent to the state in which the DC output voltage is raised, achieved by the potential difference between the higher-potential output line and the auxiliary source output line, so that the DC output voltage can be controlled to achieve stability.

The resistive potential divider circuit at the output voltage detection unit detects the DC voltage manifesting between the higher-potential output line or the lower-potential output line and the auxiliary source output line. When the resistive potential divider circuit detects the DC voltage manifesting between the lower-potential output line and the auxiliary source output line, a potential difference corresponding to the sum of the potential difference between the higher-potential output line and the auxiliary source output line and the potential difference (DC output voltage) between the pair of output lines is detected.

While the DC voltage manifesting between the higher-potential output line and the auxiliary source output line detected by the resistive potential divider circuit is lower than the detected DC voltage manifesting between the lower-potential output line and the auxiliary source output line, no problem arises in voltage detection since the difference in the potential between the higher-potential output line and the auxiliary source output line can be selected as appropriate during the design stage.

In the switching power supply in the third mode, the output voltage detection unit comprises a current mirror circuit, a resistive potential divider circuit, a 3-terminal regulator and a light emitting diode. The current mirror circuit includes a first transistor and a second transistor, with one of the main electrodes of the first transistor commonly connected with one of the main electrodes of the second transistor and the main electrodes thus commonly connected are connected to one of the pair of output lines.

The resistive potential divider circuit divides the DC voltage manifesting between the pair of output lines. The main circuit of the 3-terminal regulator, which receives a voltage signal resulting from the division achieved at the resistive potential divider circuit as a control signal, is connected to the other main electrode of the second transistor and the other output line of the pair of output lines. The light emitting diode is connected between the other main electrode of the first transistor constituting the current mirror circuit and the other output line.

When this circuit structure is adopted, the current flowing through the 3-terminal regulator is matched to the current flowing through the light emitting diode through the operation performed by the current mirror circuit. In other words, when the current flowing through the main circuit of the 3-terminal regulator fluctuates due to a change in the divided voltage supplied by the resistive potential divider circuit, this fluctuation is reflected in the current to the light emitting diode so that the current flowing through the light emitting diode matches the current flowing through the 3-terminal regulator. As a result, the current flowing through the light emitting diode changes in response to the divided voltage signal.

The ON voltage at the main circuits of the first and second transistors constituting the current mirror circuit is typically approximately 0.65V. Even when this ON voltage of 0.65V is added to the reduction voltage of 1.1V at the 3-terminal regulator, the sum is 1.75V which is lower than DC 2V. Thus, by adopting this circuit structure in a switching power supply with a DC output voltage of approximately 2V, control is achieved to stabilize the DC output voltage.

BRIEF DESCRIPTION OF THE DRAWINGS

A more complete appreciation of the invention and many of the attendant advantages thereof become better understood when referring to the following detailed description of the accompanied drawings, wherein.

DETAILED DESCRIPTION OF PREFERRED EMBODIMENTS

Figure 1:
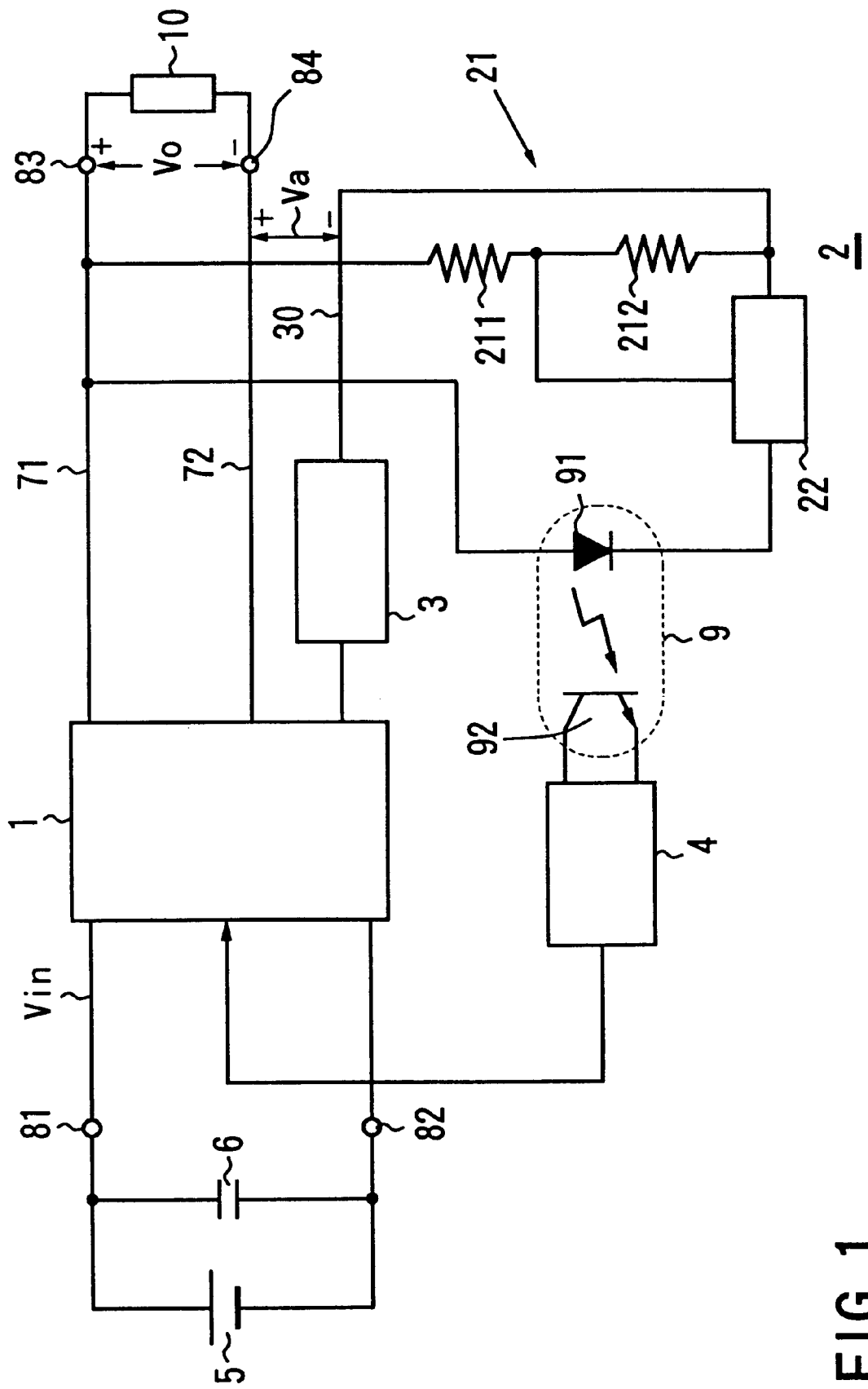
FIG. 1 is an electrical circuit diagram of the switching power supply according to the present invention.

FIG. 1 presents an electrical circuit diagram of the switching power supply in the first mode. The switching power supply in the figure includes a DC—DC converter unit 1, an output voltage detection unit 2, an auxiliary power unit 3 and a control unit 4. The DC—DC converter unit 1 converts a DC input voltage Vin supplied to input terminals 81 and 82 by a DC source 5 and a capacitor 6 to DC through switching and outputs a DC output voltage Vo for a load 10 through, at least, a pair of output lines 71 and 72. The load 10 is connected to output terminals 83 and 84.

The auxiliary power unit 3, which is electrically linked with the DC—DC converter unit 1, outputs a DC voltage Va through an auxiliary source output line 30 achieving a potential that is negative relative to the potential at the lower-potential output line 72 of the pair of output lines 71 and 72. The auxiliary power unit 3, which should preferably include a voltage stabilizing circuit, outputs a constant, stable DC voltage Va.

The output voltage detection unit 2 includes a resistive potential divider circuit 21, a 3-terminal regulator 22 and a light emitting diode 91. The resistive potential divider circuit 21, which is constituted of a serial circuit comprising resistors 211 and 212, divides the DC voltage (Vo+Va) manifesting between the higher-potential output line 71 of the pair of output lines 71 and 72 and the auxiliary source output line 30. A voltage signal resulting from the division achieved by the resistors 211 and 212 constituting the resistive potential divider circuit 21 is provided to the control terminal of the 3-terminal regulator 22. The light emitting diode 91, together with a phototransistor 92 provided at the control unit 4, constitutes a photocoupler 9. The serial circuit achieved by connecting in series the main circuit of the 3-terminal regulator 22 and the light emitting diode 91, is connected between the higher-potential output line 71 and the auxiliary source output line 30. A detection signal generated at the voltage detection unit 2 is provided to the control unit 4 via the photocoupler 9. The control unit 4 implements output voltage stabilizing control on the DC—DC converter unit 1 based upon the detection signal provided by the output voltage detection unit 2.

The basic operation performed by the switching power supply in the first mode does not differ from that achieved by the switching power supply in the prior art. Namely, the DC—DC converter unit 1 converts the DC input voltage Vin to a DC through switching and outputs the DC output voltage Vo for the load 10 through, at least, the pair of output lines 71 and 72. The output voltage detection unit 2 provides a DC voltage detection signal to the control unit 4 via the photocoupler 9. The control unit 4 implements output voltage stabilizing control on the DC—DC converter unit 1 based upon the detection signal provided by the output voltage detection unit 2. Through this sequence of operations, a stable DC output voltage Vo is obtained. The control operation performed by the control unit 6 on the DC—DC converter unit 1 may be achieved through either the self-excitation method or the separate excitation method.

The auxiliary power unit 3, which is electrically linked with the DC—DC converter unit 1, outputs the DC voltage Va through its auxiliary source output line 30 achieving a potential that is negative relative to the potential at the lower-potential output line 72 of the pair of output lines 71 and 72. Thus, the difference in the potential between the auxiliary source output line 30 and the higher-potential output line 71 of the pair of output lines 71 and 72 is the sum (Vo+Va) of the potential difference (Va) between the lower-potential output line 72 and the auxiliary source output line 30 and the potential difference (DC output voltage Vo) between the pair of output lines 71 and 72.

The main circuit of the 3-terminal regulator 22 and the light emitting diode 91 are connected to each other in series and the serial circuit thus achieved is connected between the higher-potential output line 71 and the auxiliary source output line 30. As a result, even when the DC output voltage Vo is set at, for instance, DC 2V or lower and the potential difference (DC output voltage Vo) between the pair of output lines 71 and 72 becomes small, the 3-terminal regulator 22 and the light emitting diode 91 can be operated in a state that is equivalent to the state in which the DC output voltage Vo is raised to the voltage (Vo+Va), achieved by the potential difference (Va) between the lower-potential output line 72 and the auxiliary source output line, so that the DC output voltage Vo can be controlled to achieve stability.

When the DC output voltage Vo has risen, the voltage level of the detection signal provided by the resistive potential divider circuit 22 to the control terminal of the 3-terminal regulator 22 becomes higher. In response, the 3-terminal regulator 22 performs a control operation to increase the main circuit current and, as a result, the current flowing through the light emitting diode 91 increases. The increased current at the light emitting diode 91 is supplied to the control unit 4 via the phototransistor 92 which is optically coupled to the light emitting diode 91. The control unit 4 controls the switching operation at the DC—DC converter unit 1 to lower the DC output voltage Vo.

Since the potential difference (Va) between the lower potential output line 72 and the auxiliary source output line 30 can be selected as appropriate during the design stage, the circuit structure can be adopted in a switching power supply with a DC output voltage Vo even lower than DC 2V, e.g., DC1V or lower.

Figure 2:
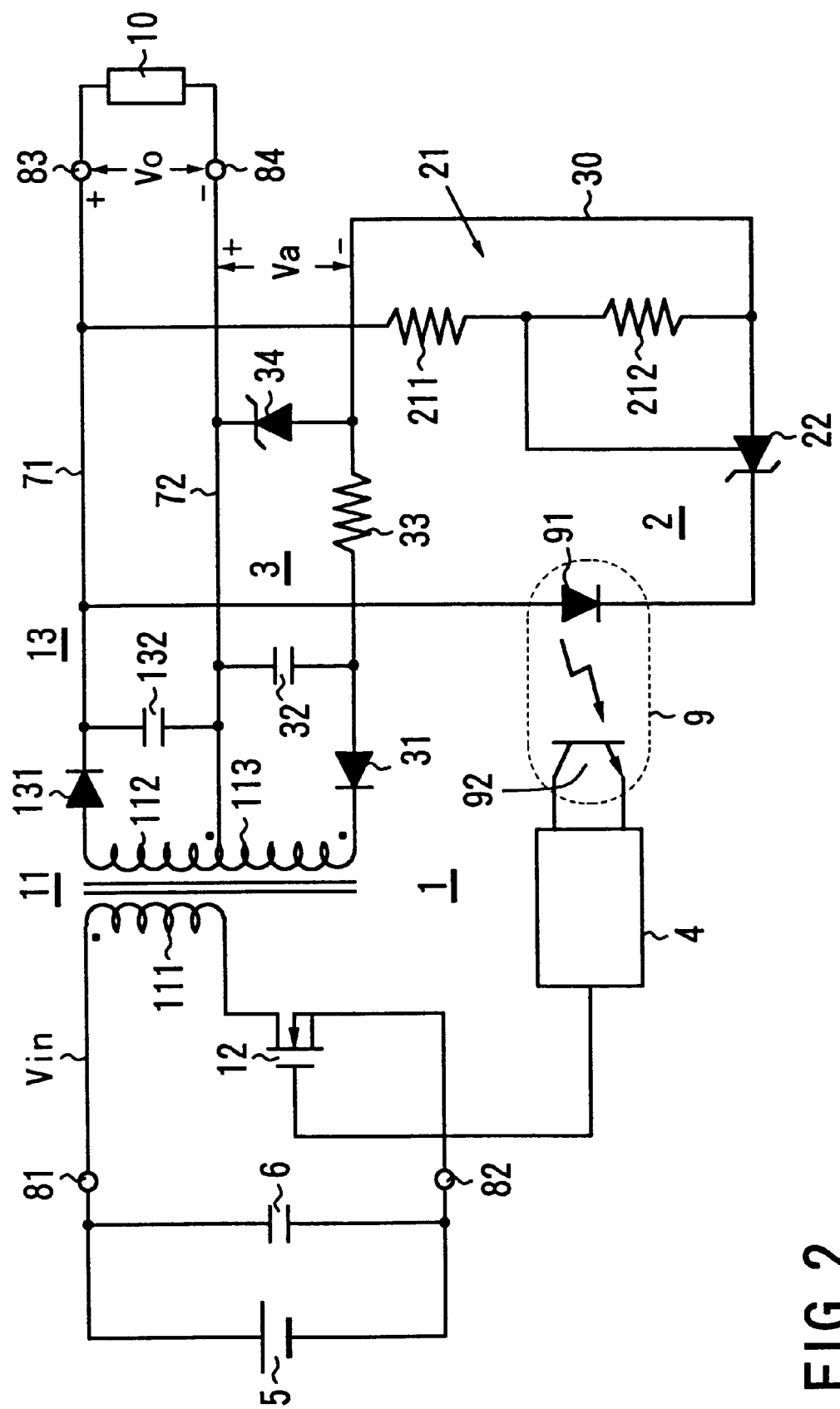
FIG. 2 is a more detailed electrical circuit diagram of the switching power supply according to the present invention shown in FIG. 1.

FIG. 2 is a more detailed electrical circuit diagram of the switching power supply in the first mode illustrated in FIG. 1. In the figure, the same reference numbers are assigned to components shown in FIG. 1. In this embodiment, the DC—DC converter unit 1 includes a conversion transformer 11, a switching element 12 and an output rectifier smoothing circuit 13. The DC input voltage Vin supplied to a first winding 111 of the conversion transformer 11 is switched by the switching element 12 connected in series to the first winding 111. The switching output manifesting at a second winding 112 of the conversion transformer 11 is converted to a DC by the output rectifier smoothing circuit 13, and the DC output voltage Vo is supplied to the load 10 through the pair of output lines 71 and 72.

The output rectifier smoothing circuit 13 includes a diode 131 and a capacitor 132. The diode 131 is oriented so that it is positioned in the forward direction relative to the flyback voltage induced at the second winding of the conversion transformer 11 when the switching element 12 is turned off. This circuit structure is normally referred to as the flyback type.

The conversion transformer 11 is provided with a third winding 113 one end of which is connected to one end of the second winding 112. The auxiliary power unit 3 generates a DC voltage by rectifying and smoothing the voltage generated at the third winding 113.

The auxiliary power unit 3 includes a rectifier smoothing circuit constituted of a diode 31 and a capacitor 32. The diode 31 outputs a voltage achieved by rectifying the flyback voltage manifesting at the third winding 113 when the switching element 12 is turned off. The capacitor 32 smooths the rectified output from the diode 31. The auxiliary power unit 3 is further provided with a Zener diode 34. Through the Zener diode 34, a stable DC voltage Va is supplied to the auxiliary source output line 30. As explained earlier, the potential at the auxiliary source output line 30 is negative (potential difference Va) relative to the potential at the lower-potential output line 72.

Figure 3:
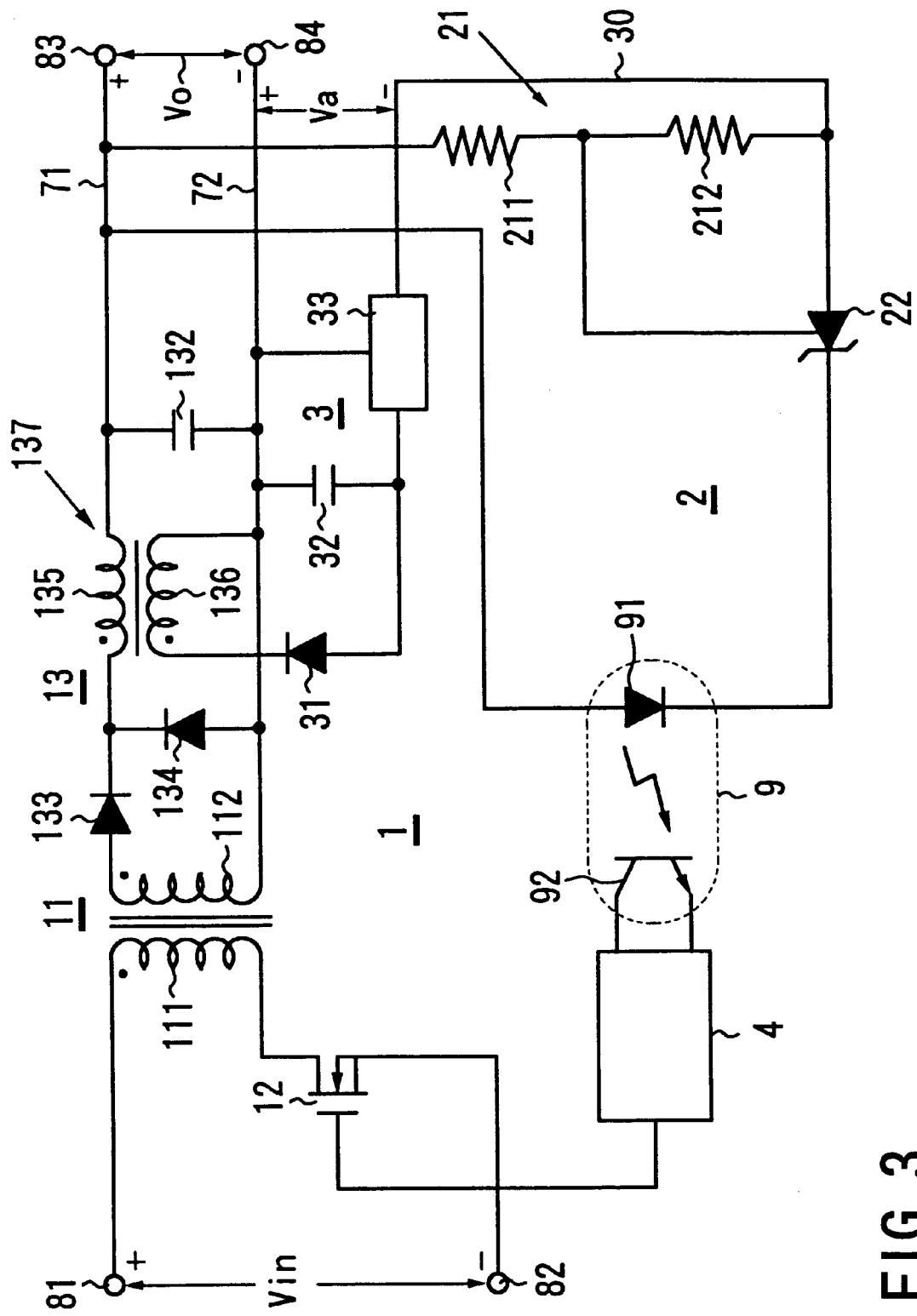
FIG. 3 is an electrical circuit diagram of another embodiment of the switching power supply shown in FIG. 1.

FIG. 3 is an electrical circuit diagram of another embodiment of the switching power supply in the first mode shown in FIG. 1. In the figure, the same reference numbers are assigned to components shown in FIG. 1. In the embodiment illustrated in the figure, the output rectifier smoothing circuit 13 includes a first diode 133, a second diode 134 and a choke coil 137. The first diode 133 is oriented so that it is positioned in the forward direction relative to the induced voltage manifesting at the second winding 112 while the switching element 12 is in an ON state. The second diode 134 is oriented so that it is positioned in the forward direction relative to the energy discharged by the choke coil 137 when the switching element 12 is turned off. This circuit structure is normally referred to as the forward type. The choke coil 137 includes a main winding 135 and an auxiliary winding 136. The main winding 135 is included in the output rectifier smoothing circuit 13, whereas the auxiliary winding 136 constitutes part of the auxiliary power unit 3.

The auxiliary power unit 3 rectifies and smooths the flyback voltage manifesting at the auxiliary winding 136 when the switching element 12 is turned off by employing the diode 31 and the capacitor 32 respectively to generate the DC voltage Va. The DC voltage Va is stabilized at the 3-terminal regulator 33. The DC voltage manifesting at the auxiliary source output line 30 via the 3-terminal regulator 33 has a potential that is negative relative to the potential at the lower-potential output line 72.

Figure 4:
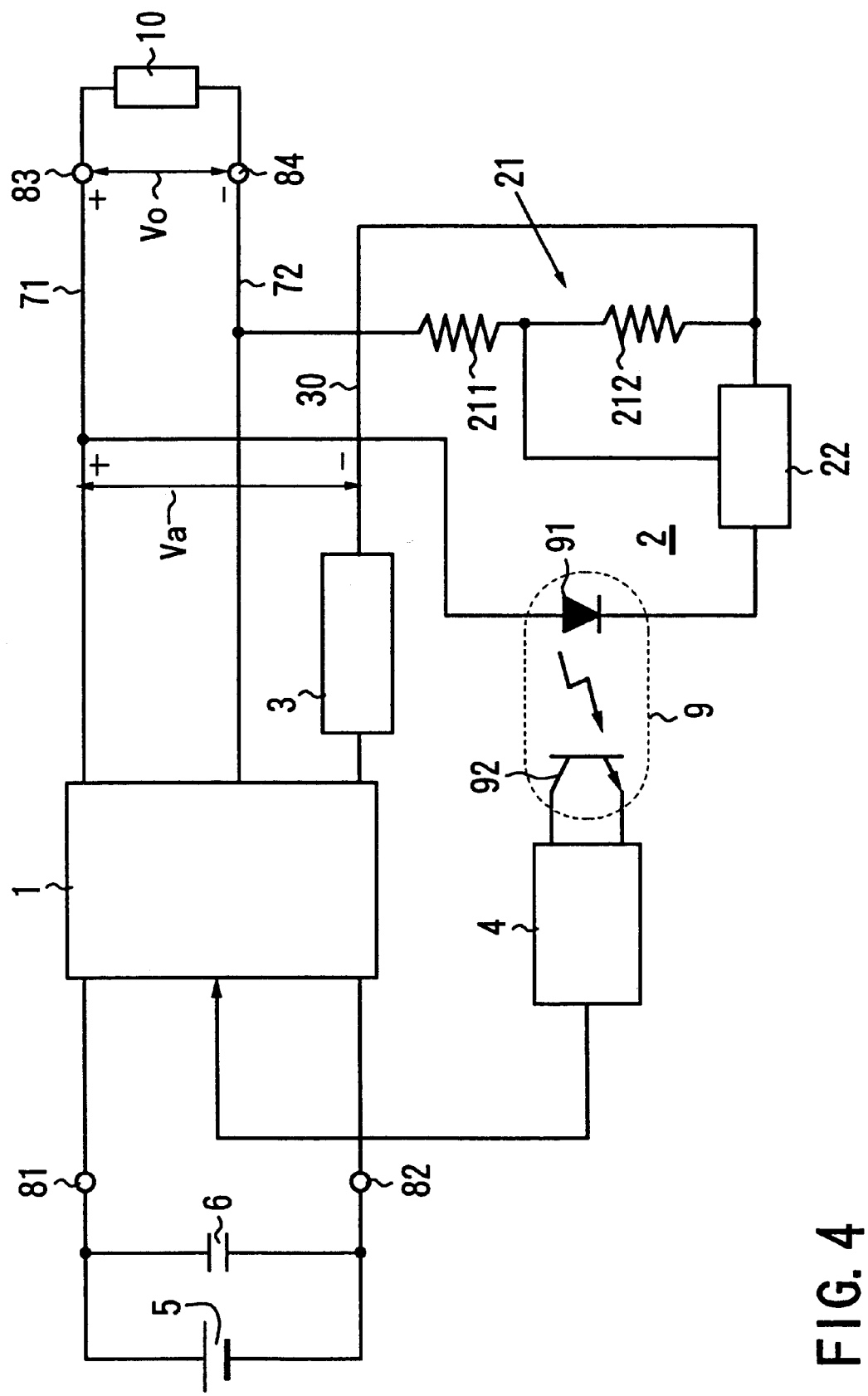
FIG. 4 is an electrical circuit diagram of yet another embodiment of the switching power supply according to the present invention.

FIG. 4 is an electrical circuit diagram of yet another embodiment of the switching power supply in the first mode. In the figure, the same reference numbers are assigned to components shown in FIGS. 1 to 3. This embodiment differs from those shown in FIGS. 1 to 3 in the circuit structure adopted at the output voltage detection unit 2. Unlike in the embodiments in FIGS. 1 to 3, the resistive potential divider circuit 21 at the output voltage detection unit 2 detects the potential difference Va manifesting between the higher-potential output line 71 and the auxiliary source output line 30 and provides the detection signal to the control unit 4 via the photocoupler 9. Although not shown, it is obvious that either of the circuit structures illustrated in FIGS. 2 and 3 may be adopted in the embodiment shown in FIG. 4.

Figure 5:
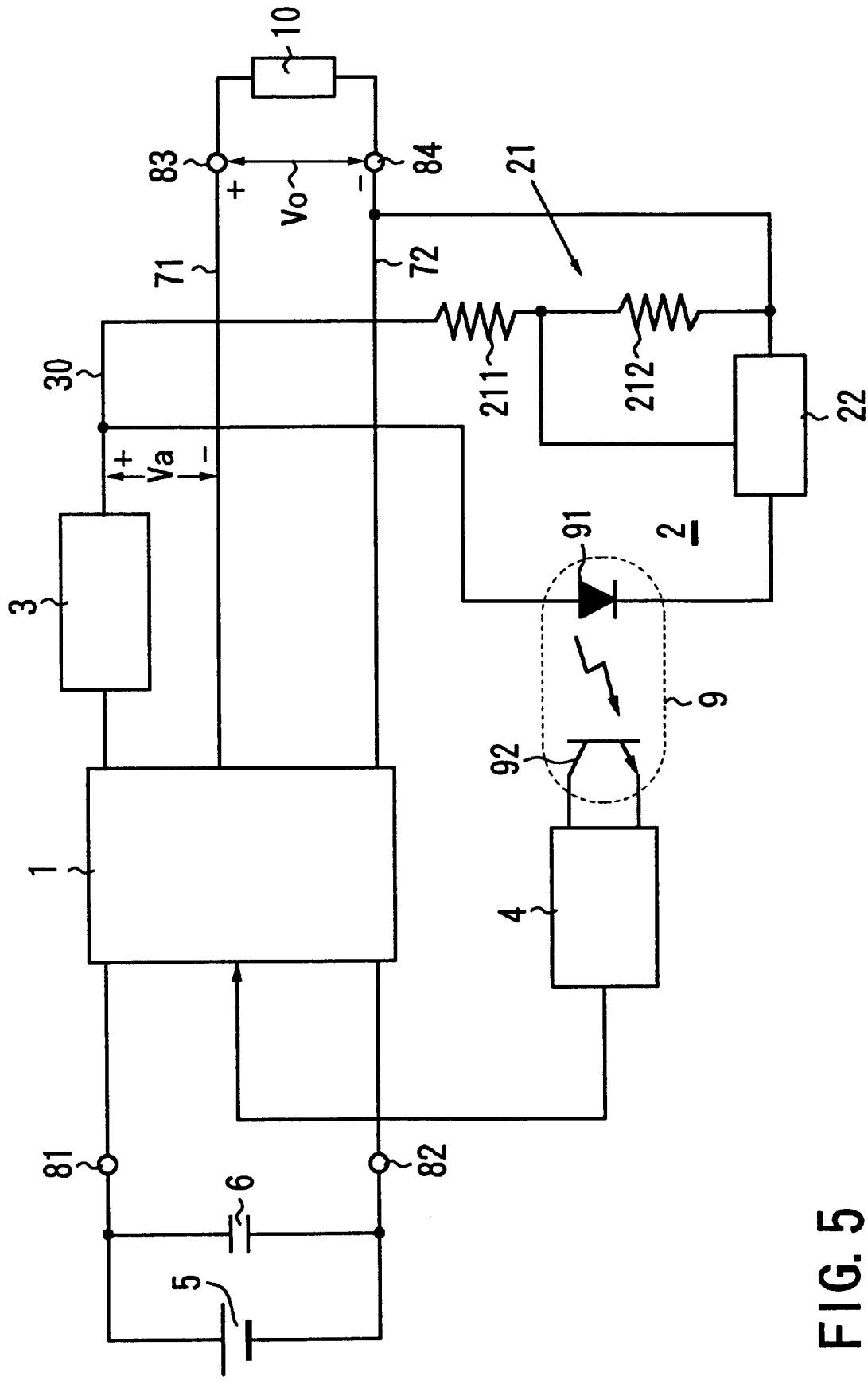
FIG. 5 is an electrical circuit diagram showing yet another embodiment of the switching power supply according to the present invention.

FIG. 5 is an electrical circuit diagram illustrating an embodiment of the switching power supply in the second mode. In this embodiment, the auxiliary power unit 3 adopts a structure slightly different from that in the switching power supply shown in FIG. 1. The auxiliary power unit 3 is electrically linked with the DC—DC converter unit 1 and outputs a DC voltage (Va) through its auxiliary source output line 30 achieving a potential that is positive relative to the potential at the higher-potential output line 71 of the pair of output lines 71 and 72.

The resistive potential divider circuit 21 constituting the output voltage detection unit 2 is connected between the lower-potential output line 72 of the pair of output lines 71 data 72 led out from the DC—DC converter unit 1 and the auxiliary source output line 30 led out from the auxiliary power unit 3, detects the DC voltage (Vo+Va) manifesting between the lower-potential output line 72 and the auxiliary source output line 30 and provides the detection signal to the control unit 4 via the photocoupler 9.

The resistive potential divider circuit 21 detects the potential difference (Vo+Va) corresponding to the sum of the potential difference between the higher-potential output line 71 of the pair of output lines 71 and 72 and the auxiliary source output line 30 and the potential difference (the DC output voltage Vo) between the pair of output lines 71 and 72. As a result, even when the DC output voltage Vo is set at, for instance, DC 2V or lower and the potential difference (the DC output voltage Vo) between the pair of output lines 71 and 72 becomes small, the output voltage detection operation can be performed in a state that is equivalent to the state in which the DC output voltage Vo is raised, achieved by the potential difference (Va) between the higher-potential output line 71 and the auxiliary source output line 30, so that the DC output voltage Vo can be controlled to achieve stability.

The main circuit of the 3-terminal regulator 22 and the light emitting diode 91 are connected to each other in series and the serial circuit thus achieved is connected between the lower-potential output line 72 and the auxiliary source output line 30. As a result, even when the DC output voltage Vo is set at, for instance, DC 2V or lower and the potential difference (the DC output voltage Vo) between the pair of output lines 71 and 72 becomes small, the 3-terminal regulator 22 and the light emitting diode 91 can be operated in a state that is equivalent to the state in which the DC output voltage Vo is raised to the voltage (Vo+Va), achieved by the potential difference (Va) between the higher-potential output line 71 and the auxiliary source output line 30, so that the DC output voltage Vo can be controlled to achieve stability.

Figure 6:
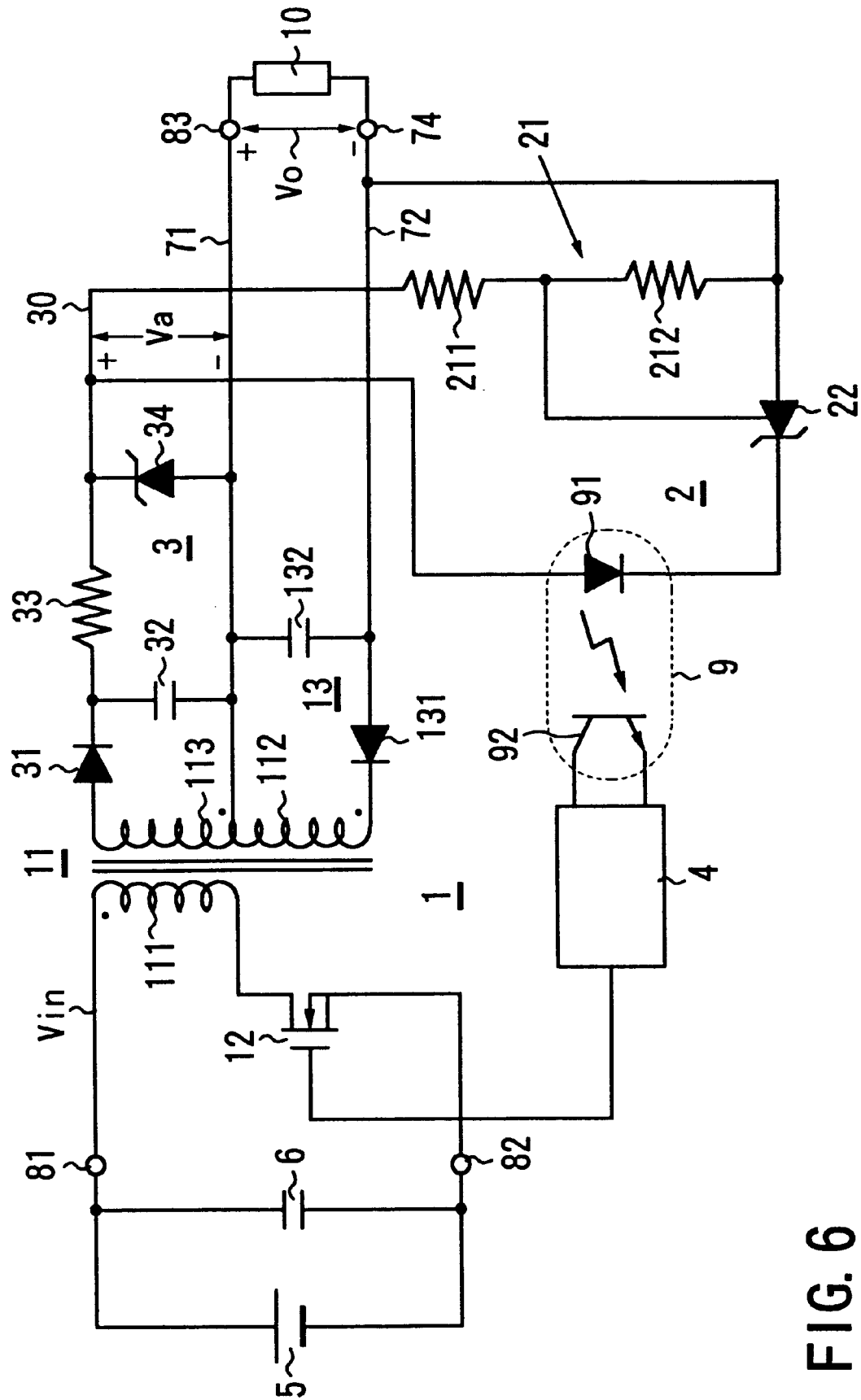
FIG. 6 is a more detailed electrical circuit diagram of the switching power supply according to the present invention shown in FIG. 5.

FIG. 6 presents a more detailed electrical circuit diagram of the switching power supply shown in FIG. 5. In the figure, the same reference numbers are assigned to components shown in FIG. 5.

In the DC—DC converter unit 1, which includes a conversion transformer 11, a switching element 12 and an output rectifier smoothing circuit 13, the DC input voltage Vin supplied to a first winding 111 of the conversion transformer 11 is switched by the switching element 12 connected in series to the first winding 111, the switching output manifesting at a second winding 112 of the conversion transformer 11 is converted to a DC by the output rectifier smoothing circuit 13 and the DC output voltage Vo is supplied to the load 10 through the pair of output lines 71 and 72.

The output rectifier smoothing circuit 13 includes a diode 131 and a capacitor 132. The diode 131 is oriented so that it is positioned in the forward direction relative to the flyback voltage induced at the second winding 112 of the conversion transformer 11 when the switching element 12 is turned off.

The conversion transformer 11 is provided with a third winding 113 one end of which is connected to one end of the second winding 112. The auxiliary power unit 3 generates a DC voltage by rectifying and smoothing the voltage generated at the third winding 113.

The auxiliary power unit 3 includes a rectifier smoothing circuit constituted of a diode 31 and a capacitor 32. The diode 31 outputs a voltage achieved by rectifying the flyback voltage manifesting at the third winding 113 when the switching element 12 is turned off. The capacitor 32 smooths the rectified output from the diode 31. The auxiliary power unit 3 is further provided with a Zener diode 34. Through the Zener diode 34, a stable DC voltage Va is supplied to the auxiliary source output line 30. As explained in reference to FIG. 5, the potential of the auxiliary source output line 30 is positive (the potential difference Va) relative to the potential at the higher-potential output line 71.

Figure 7:
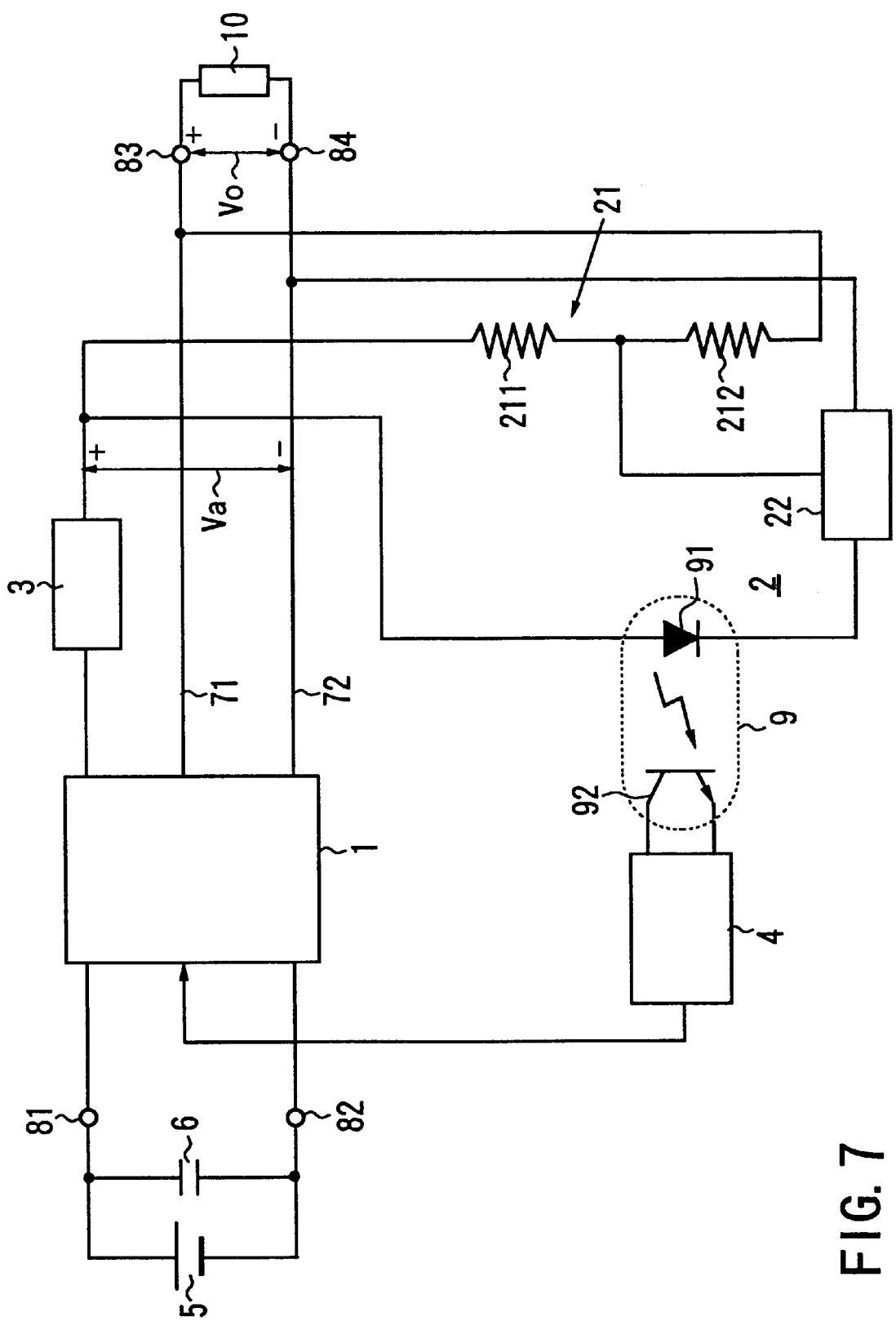
FIG. 7 is an electrical circuit diagram of yet another embodiment of the switching power supply according to the present invention.

FIG. 7 is an electrical circuit diagram of another embodiment of the switching power supply in the second mode. In the figure, the same reference numbers are assigned to components shown in FIGS. 5 and 6. This embodiment differs from that shown in FIGS. 5 and 6 in that the two ends of the resistive potential divider circuit 21 constituted of the serial circuit comprising potential dividing resistors 211 and 212 are connected to the higher-potential output line 71 and the auxiliary source output line 30. Although not shown, it is obvious that the circuit structure illustrated in FIG. 6 may be adopted in the embodiment shown in FIG. 7.

Figure 8:
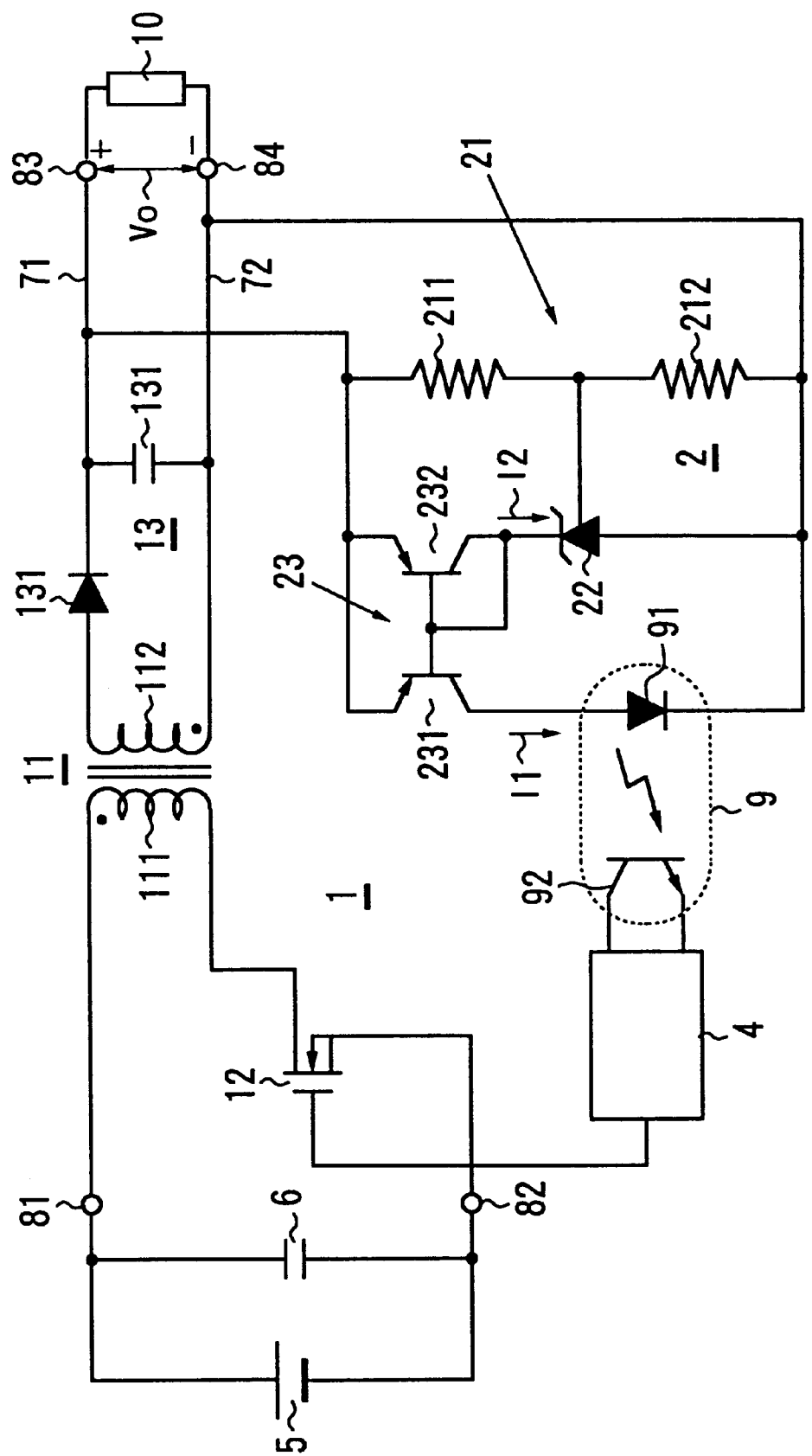
FIG. 8 is an electrical circuit diagram of yet another embodiment of the switching power supply according to the present invention.

FIG. 8 is an electrical circuit diagram illustrating an embodiment of the switching power supply in the third mode. The same reference numbers are assigned to components identical to those shown in figures referred to earlier. This embodiment is characterized by the circuit structure adopted at the output voltage detection unit 2. The output voltage detection unit 2 includes a current mirror circuit 23, a resistive potential divider circuit 21, a 3-terminal regulator 22 and a light emitting diode 91. The current mirror circuit 23 includes a first transistor 231 and a second transistor 232. The main electrodes that are connected commonly, e.g., the emitters, among the main electrodes (the emitters and the collectors) at the first and second transistors 231 and 232 may be connected to, for instance, the higher-potential output line 71. The resistive potential divider circuit 21 divides the DC voltage Vo manifesting between the pair of output lines 71 and 72.

A voltage signal achieved through the division performed at the resistive potential divider circuit 21 is provided to the control terminal of the 3-terminal regulator 22 as a control signal. The main circuit of the 3-terminal regulator 22 is connected between a main electrode (the collector) of the second transistor 232 constituting the current mirror circuit 23 and the output line 72. The light emitting diode 91 is connected between a main electrode (the collector) of the first transistor 231 constituting the current mirror circuit 23 and the lower potential output line 72.

In the embodiment illustrated in FIG. 8, through the operation performed by the current mirror circuit 23, the current flowing through the 3-terminal regulator 22 is matched with the current flowing through the light emitting diode. In other words, when the current I2 flowing through the main circuit of the 3-terminal regulator 22 fluctuates due to a change in the divided voltage supplied by the resistive potential divider circuit 21, this fluctuation is reflected in the current at the light emitting diode so that the current I1 flowing through the light emitting diode 91 becomes matched to the current I2 flowing through the 3-terminal regulator. As a result, the current I1 flowing through the light emitting diode 91 changes in response to the divided voltage signal provided to the 3-terminal regulator 22.

Typically, the ON voltage (the ON voltage between the emitters and the collectors) at the main circuits of the first and second transistors 231 and 232 constituting the current mirror circuit 23 is approximately 0.65V. Even when the ON voltage of 0.65V is added to the reduction voltage of 1.1V at the 3-terminal regulator 22, the sum is 1.75V which is lower than DC 2V. Thus, by adopting this circuit structure in a switching power supply with a DC output voltage Vo of approximately 2V, control is achieved to stabilize the DC output voltage Vo.

Although not shown, it is obvious that circuits explained in reference to the embodiments and circuits that may be achieved in an obvious application of these embodiments may be combined in numerous ways and that there are a number of variations possible.

As has been explained, according to the present invention, a switching power supply that is capable of executing output voltage stabilizing control with a high degree of reliability even when the DC output voltage is DC 2V or lower is provided.

What is claimed is:

1. A switching power supply comprising:
   a DC—DC converter unit that converts a DC to a DC through switching and outputs a DC voltage for a load through, at least, a pair of output lines;
   an auxiliary power unit electrically linked to said DC—DC converter unit, that outputs a DC voltage through an auxiliary source output line having a potential that is negative relative to the potential at a lower-potential output line of said pair of output lines;
   an output voltage detection unit that includes a resistive potential divider circuit that divides a DC voltage manifesting between a higher-potential output line or said lower-potential output line and said auxiliary source output line, a 3-terminal regulator that receives a voltage signal resulting from the division achieved at said resistive potential divider circuit as a control signal and a light emitting diode connected in series to the main circuit of said 3-terminal regulator, with the serial circuit constituted of said light emitting diode and the main circuit of said 3-terminal regulator located between said higher-potential output line of said pair of output lines led out from said DC—DC converter unit and said auxiliary source output line led out from said auxiliary power unit; and a control unit that includes a phototransistor employed in combination with said light emitting diode and implements output voltage stabilizing control on said DC—DC converter unit based upon a detection signal provided via said light emitting diode and said phototransistor.

2. A switching power supply comprising:

a DC—DC converter unit that converts a DC to a DC through switching and outputs a DC voltage for a load through, at least, a pair of output lines;

an auxiliary power unit electrically linked to said DC—DC converter unit, that outputs a DC voltage through an auxiliary source output line having a potential that is positive relative to the potential at a lower-potential output line of said pair of output lines;

an output voltage detection unit that includes a resistive potential divider circuit that divides a DC voltage manifesting between a lower-potential output line or said higher-potential output line and said auxiliary source output line, a 3-terminal regulator that receives a voltage signal resulting from the division achieved at said resistive potential divider circuit as a control signal and a light emitting diode connected in series to the main circuit of said 3-terminal regulator, with the serial circuit constituted of said light emitting diode and the main circuit of said 3-terminal regulator located between said lower-potential output line of said pair of output lines led out from said DC—DC converter unit and said auxiliary source output line led out from said auxiliary power unit; and a control unit that includes a phototransistor employed in combination with said light emitting diode and implements output voltage stabilizing control on said DC—DC converter unit based upon a detection signal provided via said light emitting diode and said phototransistor.

3. The switching power supply of claim 1, wherein:

at said DC—DC converter unit, which includes a conversion transformer, a switching element and an output rectifier smoothing circuit, a DC input supplied to a first winding of said conversion transformer is switched by said switching element connected in series to said first winding, and a switching output manifesting at a second winding of said conversion transformer is converted to DC by said output rectifier smoothing circuit to output a DC voltage through said pair of output lines;

said conversion transformer is provided with a third winding one end of which is connected to one end of said second winding; and said auxiliary power unit rectifies and smooths a voltage generated at said third winding to generate a DC voltage.

4. The switching power supply of claim 3, wherein:

said output rectifier smoothing circuit includes;

a first diode oriented so that said first diode is positioned in a forward direction relative to an induced voltage manifesting at said second winding while said switching element is in an ON state;

a second diode oriented so that said second diode is positioned in a forward direction relative to energy discharged through a choke coil included in said output rectifier smoothing circuit when said switching element is turned off; and said choke coil that includes a main winding and an auxiliary winding, with said main winding included in said output rectifier smoothing circuit and said auxiliary winding included in said auxiliary power unit.

5. A switching power supply comprising:

a DC—DC converter unit that converts a DC to a DC through switching and outputs a DC voltage for a load through, at least, a pair of output lines;

an output voltage detection unit that includes;

a current mirror circuit constituted of a first transistor and a second transistor with one main electrode of said first transistor commonly connected with one main electrode of said second transistor and the main electrodes thus commonly connected to one of said pair of output lines;

a resistive potential divider circuit that divides a DC voltage manifesting between said pair of output lines;

a 3-terminal regulator that receives a voltage signal resulting from the division achieved at said resistive potential divider circuit as a control signal, with a main circuit thereof connected to another main electrode of said second transistor and the other output line of said pair of output lines; and a light emitting diode connected between another main electrode of said first transistor constituting said current mirror circuit and the other output line;

a control unit that includes a phototransistor employed in combination with said light emitting diode and implements output voltage stabilizing control on said DC—DC converter unit based upon a detection signal provided by said output voltage detection unit via said light emitting diode and said phototransistor.

* * * * *